Patented Jan. 11, 1949

2,458,776

UNITED STATES PATENT OFFICE 2,458,776

DISAZO DYESTUFFS AND A PROCESS FOR THEIR MANUFACTURE

Philippe Grandjean, Basel, Switzerland, assignor to Sandoz Limited, Basel, Switzerland, a Swiss firm No Drawing. Application May 26, 1947, Serial No. 750,647. In Switzerland May 29, 1946

8 Claims. (Cl. 260—187)

The present invention relates to new disazo dyestuffs and to a process for their manufacture.

It has been found that new valuable disazo dyestuffs can be prepared by coupling 2-(4'-aminobenzoylamino)-5-hydroxynaphthalene-7-sulfonic acid with a diazotised aminoazo dyestuff of the general formula

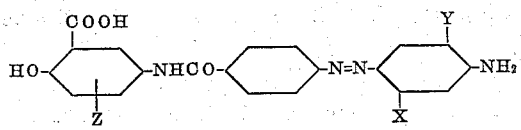

wherein X stands for an alkyl, an alkoxy or an acylamino group, Y stands for hydrogen or for an alkyl or an alkoxy group, and wherein Z stands for hydrogen or alkyl.

The aminoazo dyestuffs used as starting products for the present process and corresponding to the above general formula can be prepared by diazotizing 4-(4'-amino-benzoylamino)-1-hydroxybenzene-2-carboxylic acid or a derivative thereof and coupling the diazotized product with an amine of the benzene series possessing a free position in p-position to the amino group and a substituent, like an alkyl, alkoxy or acylamino group, in meta-position to the said amino group. These amines may further contain a second substituent, like an alkyl or an alkoxy group, in p-position to the first mentioned substituent. Sometimes it may be advantageous to use, instead of the free amines, their omega-methanesulfonic acids. In this case the sulfomethyl group must be removed after formation of the monoazo dyestuffs by heating the same with an alkali or a diluted acid.

The new dyestuffs obtained according to the present process are, in a dry state, dark powders easily soluble in water. They dye cotton and regenerated cellulose fibres in red, bordeaux-red, violet or blue shades possessing good fastness properties to light. They can be diazotized on the fibre and developed for example with β-naphthol. By this treatment the shades will generally slightly be modified, but the fastness to water, to washing, perspiration and to crossdyeing are generally considerably improved. When after-treated with usual anti-crease agents, the direct and developed dyeings show an unexpected improvement of the fastness to light.

The present invention is characterized by the fact that the aminoazo dyestuffs used as starting materials and corresponding to the general formula given above must contain in o-position to the azo group identified by X in the above general formula a substituent different from hydrogen. The new dyestuffs obtainable by the present process are much faster to water, to washing and to light than the dyestuffs which can be obtained by diazotization of the aminoazo dyestuffs corresponding to the above general formula, in which X stands for hydrogen and Y has the same signification as above, and coupling the said diazo compounds with 2-(4'-aminobenzoylamino)-5-hydroxynaphthalene-7-sulfonic acid. The action of the substituent X on the fastness properties of the new dyestuffs could not be expected and is very surprising. The new dyestuffs also differ from the dyestuffs which can be obtained according to the process described in French Patent 882,406 by diazotizing the aminoazo dyestuffs corresponding to the above cited general formula and coupling the resulting diazo compounds with 2-acylamino-5-hydroxynaphthalene-7-sulfonic acid free from diazotizable amino groups, such as for example with 2-benzoylamino-5-hydroxynaphthalene-7-sulfonic acid. The fact that the new dyestuffs can be diazotized on the fibre and developed with β-naphthol makes it possible to produce dyeings which possess much better fastness properties to wet treatments. Furthermore the direct dyeings as well as the developed dyeings of the new dyestuffs are more suitable for anti-crease finishing insofar as their shades are less altered by such a procedure than the analogous dyestuffs known hitherto, while their fastness to light is clearly improved.

The following examples, without being limitative, illustrate the present process, the parts being by weight.

Example 1

272 parts of 4-(4'-aminobenzoylamino)-1-hydroxybenzene-2-carboxylic acid are diazotized in the usual manner and introduced into an aqueous solution containing 107 parts of 1-amino-3-methylbenzene and 125 parts of hydrochloric acid 30 per cent. The aqueous solution is then slowly neutralized by addition of an aqueous solution of sodium acetate, until the coupling is finished, which takes about some hours. The monoazo dyestuff thus obtained is then filtered. For the second diazotization it is suspended in water, 69 parts of sodium nitrite are added thereto and the solution acidulated with hydrochloric acid. After the diazotization is finished, the coupling is carried out in the presence of sodium carbonate with an aqueous solution of 358 parts of 2-(4'-aminobenzoylamino)-5-hydroxynaphthalene-7-sulfonic acid in the presence of 133 parts of caustic soda lye 30 per cent. The coupling proceeds very rapidly and the disazo dyestuff thus formed is precipitated, while warm, by means of addition of sodium chloride, then filtered and dried.

The new dyestuff is, in the dry state, a dark powder soluble in water and dyeing cotton and regenerated cellulose fibres in red-bordeaux shades possessing an excellent light-fastness.

By diazotization on the fibre and development with β-naphthol the dyeings become somewhat bluer and their fastness properties to water, washing and perspiration become greatly improved. On treatment with anticreasing agents generally used for anti-crease finishing, the shade becomes slightly modified, while the fastness to the light will be improved.

By replacing 1-amino-3-methylbenzene by 1-amino-3-acetylaminobenzene a dyestuff will be obtained, which dyes in reddish-bordeaux shades possessing the same fastness properties. By using 1-amino-3-methoxybenzene, instead of 1-amino-3-methylbenzene, a dyestuff dyeing in dark bordeaux shades will be obtained.

Example 2

272 parts of 4-(4'-aminobenzoylamino)-1-hydroxy-benzene-2-carboxylic acid are diazotized in the usual manner and coupled in the presence of sodium acetate with an aqueous solution of 201 parts of 3-methylaniline-methane sulfonic acid in the presence of 133 parts of caustic soda lye 30 per cent. The coupling is carried out at room temperature and is complete after 2 hours. The sulfomethyl group is then removed by heating the dyestuff to 50–60° C. with a solution of caustic sodium hydroxide 10 per cent. The aminoazo dyestuff thus obtained is first precipitated by means of hydrochloric acid, then diazotized and coupled with 2-(4'-aminobenzoylamino)-5-hydroxynaphthalene-7-sulfonic acid in the manner described in Example 1, whereby an identical disazo dyestuff to that described in Example 1 will be obtained.

Example 3

The diazo compound obtained from 272 parts of 4-(4'-aminobenzoylamino)-1-hydroxybenzene-2-carboxylic acid is introduced into a solution of 121 parts of 1-amino-2:5-dimethylbenzene, dissolved in 300 parts of water and 125 parts of hydrochloric acid 30 per cent. The mixture is then slowly neutralized by means of a sodium acetate solution, until the coupling has taken place. The aminoazo dyestuff thus obtained is then filtered off, suspended in dilute hydrochloric acid and diazotized by addition of 69 parts of sodium nitrite. After complete diazotization the resultant diazo compound is coupled in the presence of sodium carbonate with 358 parts of 2-(4'-aminobenzoylamino)-5-hydroxynaphthalene-7-sulfonic acid in the presence of 133 parts of caustic soda lye 30 per cent. The disazo dyestuff thus obtained is precipitated, while warm, by addition of sodium chloride, filtered and dried. The new dyestuff is a dark powder, soluble in water, dyeing cotton and regenerated cellulose fibres into dark bordeaux shades possessing excellent fastness properties to light.

By diazotization on the fibre and development with β-naphthol, the shade of the dyeings will be slightly modified, but their fastness properties to water, washing, to perspiration and cross-dyeing are strongly improved.

The shades of the direct dyeings and of the developed dyeings are also slightly modified on after-treatment with anti-creasing agents, while their fastness to light is improved.

Example 4

272 parts of 4-(4'-aminobenzoylamino)-1-hydroxybenzene-2-carboxylic acid are diazotized in the usual manner and coupled with an aqueous solution containing 137 parts of 1-amino-2-methoxy-5-methylbenzene and 125 parts of hydrochloric acid 30 per cent, care being taken that, during the coupling operation, the solution is neutralized by addition of an aqueous solution of sodium acetate. After completion of the coupling operation the aminoazo dyestuff is filtered, suspended in water, then 69 parts of sodium nitrite are added thereto and the diazotization carried out by addition of hydrochloric acid. When the diazotization is finished, this solution is poured into an aqueous solution consisting of 358 parts of 2-(4'-aminobenzoylamino)-5-hydroxynaphthalene-7-sulfonic acid containing 133 parts of caustic soda lye 30 per cent and an excess of sodium carbonate. The disazo dyestuff thus formed is precipitated in the warm by means of sodium chloride, filtered and dried.

The new dyestuff thus obtained is, in the dry state, a dark powder dyeing cotton and regenerated cellulose fibres into violet shades which are very fast to light.

By diazotization on the fibre and development with β-naphthol, the wet fastness properties become strongly increased, whereas the shade changes only slightly.

By replacing 1-amino-2-methoxy-5-methylbenzene by 1-amino-2:5-dimethoxybenzene a dyestuff dyeing cotton and regenerated cellulose fibres into blue shades will be obtained. These dyeings possess similar fastness properties.

Example 5

286 parts of 4-(4'-aminobenzoylamino)-1-hydroxybenzene-6-methyl-2-carboxylic acid are diazotized in the usual manner and coupled with an aqueous solution containing 107 parts of 1-amino-3-methylbenzene and 125 parts of hydrochloric acid 30 per cent. The coupling solution is slowly neutralized with an aqueous solution of sodium acetate. The aminoazo dyestuff thus obtained is isolated, diazotized and coupled with 358 parts of 2-(4'-aminobenzoylamino)-5-hydroxynaphthalene-7-sulfonic acid in the same manner as described in Example 1. A disazo dyestuff will be obtained that possesses the same shade and the same properties as the dyestuff obtained according to Example 1.

What I claim is:

1. A process for the manufacture of a disazo cule of 2-(4'-aminobenzoylamino)-5-hydroxynaphthalene-7-sulfonic acid with one molecule of a diazotized monoazo dyestuff of the general formula

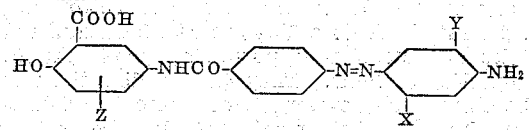

wherein X stands for a member selected from the group consisting of alkyl, alkoxy and acylamino, Y stands for a member selected from the group consisting of hydrogen, alkyl and alkoxy and Z stands for a member of the group consisting of hydrogen and alkyl.

2. A process for the manufacture of a disazo dyestuff comprising the step of coupling one molecule of 2-(4'-aminobenzoylamino)-5-hydroxynaphthalene-7-sulfonic acid with one molecule of a diazotized monoazo dyestuff of the formula

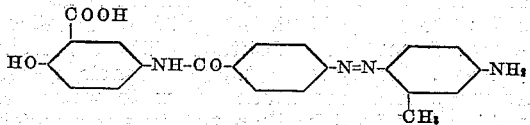

3. A process for the manufacture of a disazo dyestuff comprising the step of coupling one molecule of 2-(4'-aminobenzoylamino)-5-hydroxynaphthalene-7-sulfonic acid with one molecule of a diazotized monoazo dyestuff of the formula

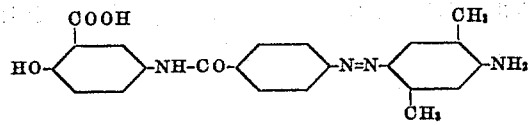

4. A process for the manufacture of a disazo dyestuff comprising the step of coupling one molecule of 2-(4'-aminobenzoylamino)-5-hydroxynaphthalene-7-sulfonic acid with one molecule of a diazotized monoazo dyestuff of the formula

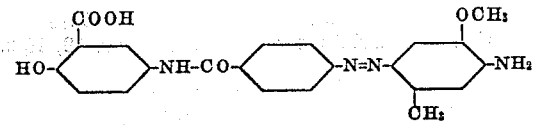

5. A disazo dyestuff of the formula

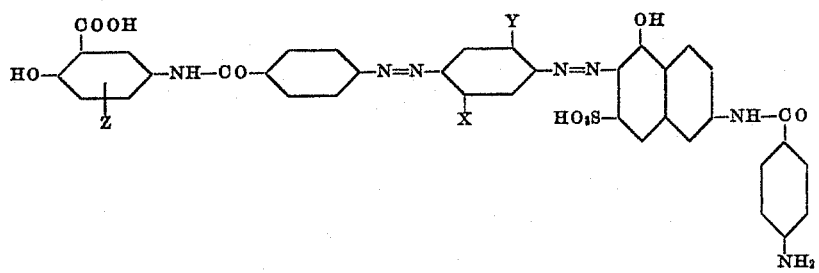

wherein X stands for a member selected from the group consisting of alkyl, alkoxy and acylamino, Y stands for a member selected from the group consisting of hydrogen, alkyl and alkoxy and Z stands for a member of the group consisting of hydrogen and alkyl.

6. The disazo dyestuff of the formula

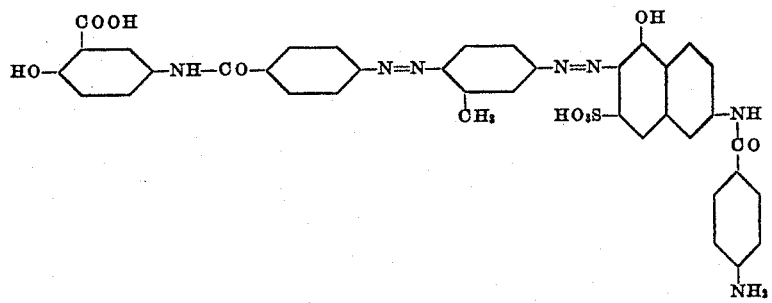

7. The disazo dyestuff of the formula

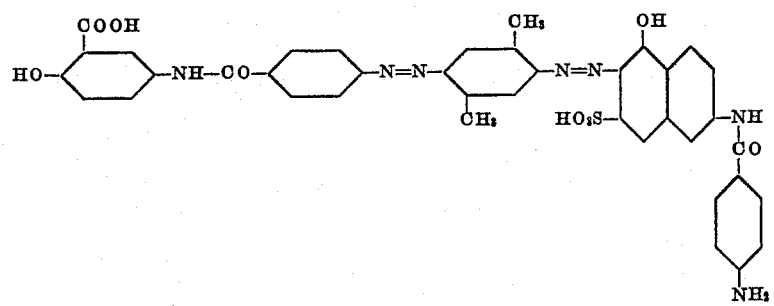

8. The disazo dyestuff of the formula

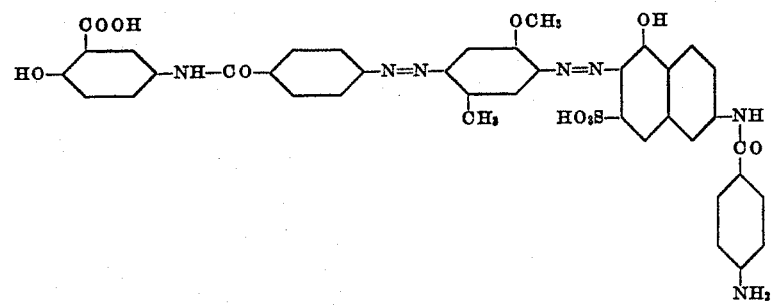

PHILIPPE GRANDJEAN.

(References on following page)

REFERENCES CITED

The following references are of record in the file of this patent:

UNITED STATES PATENTS

| Number | Name | Date |
|---|---|---|
| 1,904,820 | Brightman | Apr. 18, 1933 |
| 2,061,104 | Roos | Nov. 17, 1936 |
| 2,157,877 | Winkeler et al. | May 9, 1939 |
| 2,172,691 | Roos | Sept. 12, 1939 |
| 2,228,321 | Messmer | Jan. 14, 1941 |
| 2,232,870 | Roos | Feb. 25, 1941 |

Certificate of Correction

Patent No. 2,458,776.　　　　　　　　　　　　　　　　　　　　January 11, 1949.

PHILIPPE GRANDJEAN

It is hereby certified that error appears in the printed specification of the above numbered patent requiring correction as follows:

Column 4, line 49, claim 1, after the word "disazo" insert *dyestuff comprising the step of coupling one mole-*;

and that the said Letters Patent should be read with this correction therein that the same may conform to the record of the case in the Patent Office.

Signed and sealed this 6th day of December, A. D. 1949.

[SEAL]

THOMAS F. MURPHY,
　　　　　　　　　　　　　　　　　　　　　　　　　　*Assistant Commissioner of Patents.*